July 4, 1944.  A. E. DITTRICH  2,352,697

JIG FOR WELDING STRUCTURAL SHAPES

Filed Aug. 3, 1940  2 Sheets-Sheet 1

INVENTOR
ALEX E. DITTRICH
BY
ATTORNEY

INVENTOR
ALEX E. DITTRICH
BY
ATTORNEY

Patented July 4, 1944

2,352,697

UNITED STATES PATENT OFFICE 2,352,697

JIG FOR WELDING STRUCTURAL SHAPES

Alex Edward Dittrich, Maywood, N. J., assignor to The Linde Air Products Company, a corporation of Ohio Application August 3, 1940, Serial No. 350,263

11 Claims. (Cl. 113—59)

This invention relates to welding apparatus and more particularly to work aligning, positioning and bracing apparatus for use in fabricating structural members by welding.

In fabricating structural members, such as H-beams, I-beams, channels, etc., by welding, flat plates are first arranged in the proper angular relation to each other and temporarily united by a series of tack welds. Due to the lack of suitable aligning apparatus or jigs, considerable difficulty has been experienced hitherto in properly aligning the component elements of such fabricated structural members.

After the parts of the structural members have been temporarily united by tack welds, they are permanently united by one or more seam or fillet welds. During the seam welding operation, considerable distortion of the component parts of the structural member may occur due to uneven heating. Furthermore, considerable time and labor are necessary to properly position the temporarily tack welded members for the seam welding operations. These several factors have mitigated somewhat the advantages inherent in fabricating such members from flat plates.

It is therefore among the objects of this invention to provide apparatus for fabricating structural members by welding in which the members to be welded may be readily temporarily aligned for tack welding and positioned for seam welding, and distortion of the component elements be restrained or prevented; to provide means for aligning flat plates to form a structural member; to provide means for supporting one or more structural members in position for seam welding and in operative relation to a welding head and adapted to permit ready repositioning of the members for successive welds; to provide means engaging portions of structural members to restrain or prevent distortion during welding; and to provide a simple, economical and efficient welding jig and brace.

These and other objects of the invention will in part be obvious and in part become apparent from the following description and accompanying drawings, in which.

Generally speaking, the welding apparatus of the invention includes means for aligning flat plates for tack welding to form a structural member; means for supporting one or more fabricated structural members in position for seam welding; means engaging portions of such members to restrain or prevent distortion during the seam welding operations; and means for traversing a welding head, or other weld forming device along such structural members to permanently weld unite the parts of such members.

Figure 1:
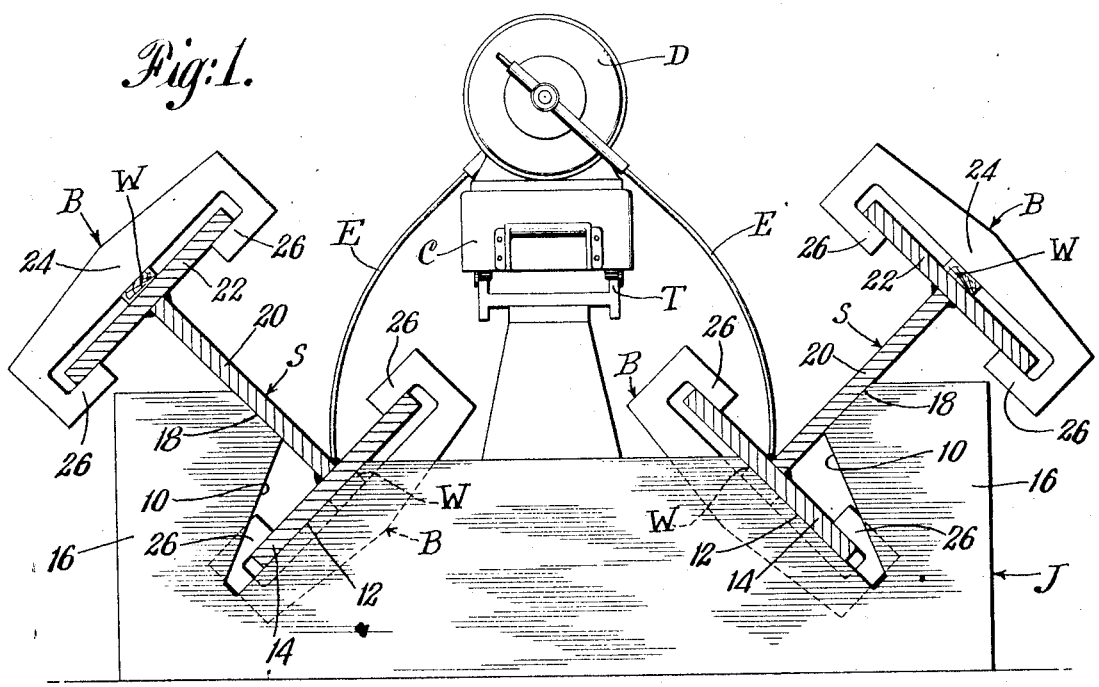
Fig. 1 is an end view of apparatus constructed according to the invention.
Figure 2:
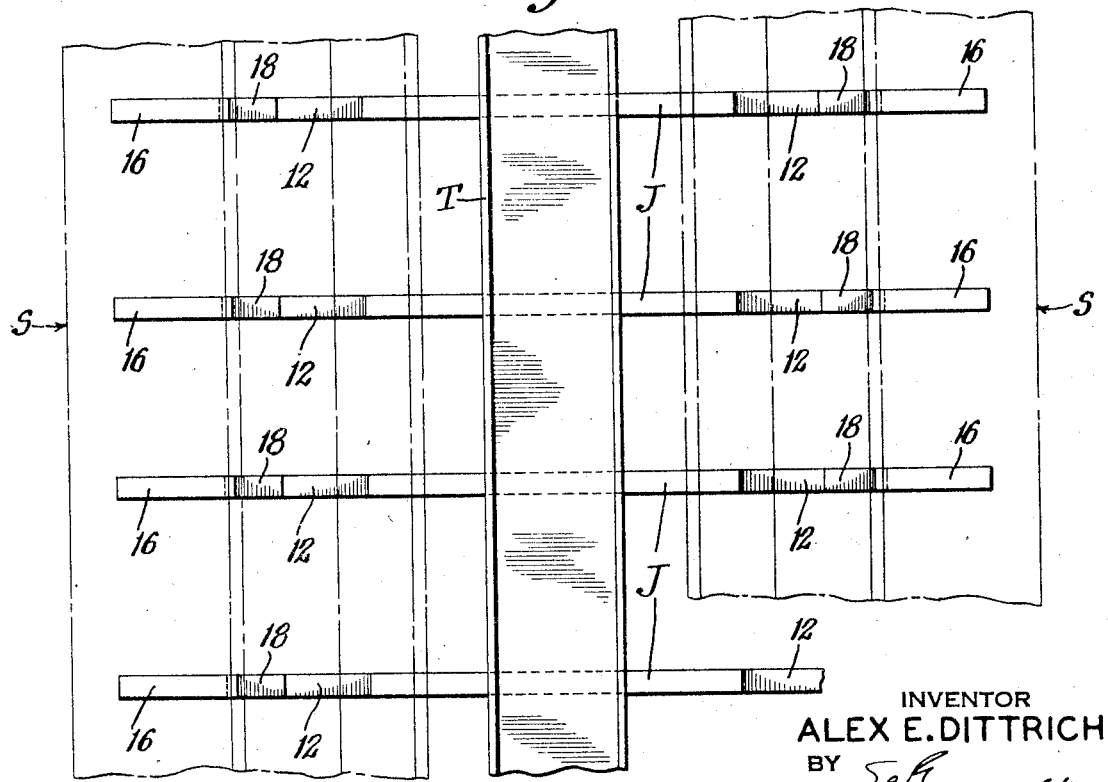
Fig. 2 is a plan view of the apparatus shown in Fig. 1, with a carriage and welding device omitted.

Referring to the drawings, and more particularly to Figs. 1 and 2 thereof, the apparatus of the invention includes a plurality of jigs or supports J arranged in longitudinally spaced, parallel relation to receive and support one or more fabricated structural members S, S. Extending longitudinally of the series of jigs or supports J, and supported on and secured to the elevated central portions thereof, is a track T on and along which is propelled a suitable motive device or traversing means such as an electrically driven carriage C. The carriage C may carry one or more suitable welding devices, such as automatic electric welding heads D feeding an electrode E toward the seam to be welded and supplying electric current to the seam for the welding operation. Any other suitable welding device may be used, such as, for instance, one or more welding blowpipes. A preferred form of welding device is the automatic electric welding head described and claimed in Baird et al., Patent No. 2,182,575. For the sake of simplicity, the welding device D and electrode E have been illustrated somewhat diagrammatically in the drawings.

The jigs J may consist of heavy steel plates, having the opposite ends thereof provided with recesses 10, each having an inclined supporting surface 12 for engagement with a flange 14 of one of the structural members S, S, and near their ends 16, the jigs are formed with other inclined supporting surfaces 18 adapted to engage the webs 20 of the members S. It will be noted that surfaces 12 and 18 are perpendicular to each other to support flanges 14 and webs 20 in their proper relative positions.

Due to the relative location of the recesses 10 at a substantial distance from track T, it will be readily apparent that, when one weld or series of welds have been made in the members S, these members may be readily lifted from the recesses and repositioned for further welding operations without interference with track T. The members S may be repositioned in the same recesses or may be transposed. By mounting an appropriate number of welding devices on the carriage C, both members S may be welded, on one side, in a single traverse of carriage C along track T. The members S may then be lifted from recesses 16 and repositioned with the reverse side in operative relation to the welding devices. The seams in such reverse sides may then be welded in a single traverse of carriage C along track T in the reverse direction. The series of longitudinally spaced jigs or supports J, with the surfaces 12 and 13 formed thereon, assure adequate support of members S throughout their length. This factor prevents distortion and misalignment of the members S during the fillet or seam welding operations.

To prevent distortion of the members S, S during the seam or fillet welding operations, a series of rigid steel braces B (Figs. 3 and 4) are secured at substantially equal, longitudinally spaced intervals to the lower flange 14 and upper flange 22 of each member S, and between the jigs or supports J. Each brace B is generally C-shaped longitudinally, and includes a central or bight portion 24, of considerable depth, adapted to be spaced from a plate to which the brace is attached. The brace decreases in depth from its central portion toward each end where it terminates in hook portions 26, which are integral with the central portion 24 and are adapted to engage beneath the edges of the plate to which the brace is attached.

It should be noted that as shown in the drawings the hook portions 26 are spaced apart a sufficient distance to leave a clear space on each side of the web 20 for adequate access of a welding device to the corner between the web 20 and the flange plate 22 where the longitudinal welding operation is to be performed. Accordingly, the hook portions 26 are spaced apart a distance greater than their spacing from the bight portion 24, or greater than the depth of the bight portion 24. The top of the hook portions 26 is preferably parallel to the flange plate 22, for bearing purposes. The bight portion 24, the end portions depending therefrom, and the hook portions 26 extending inwardly from the depending end portions are preferably all of the same thickness.

Figure 5:
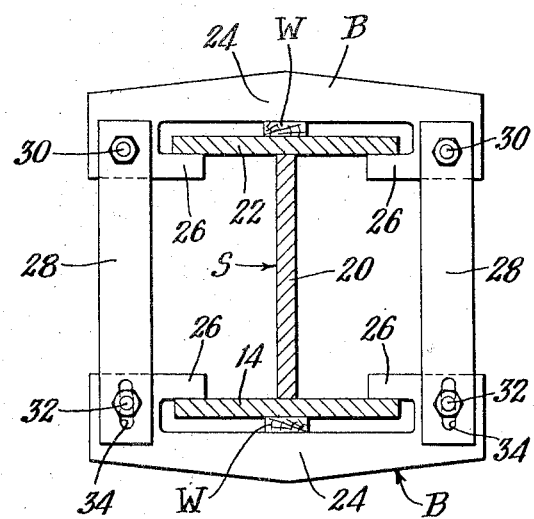
Fig. 5 is an end view of a jig for aligning structural shapes for tack welding and incorporating the brace of Figs. 3 and 4.

In forming a fabricated structural member, the parts first are arranged and supported in the aligning jig shown in Fig. 5. This jig comprises a pair of the braces B secured together by suitable means, such as struts or straps 28. The straps 28 may be pivotally secured to one brace, as by bolts 30, and adjustably secured to the other brace by clamping bolts 32 engaging slots 34 in the ends of the straps.

The bolts 32 are disengaged from straps 28 and the required number of upper and lower braces B are slid onto the flanges of the member S, with the hook portions 26 engaging beneath the edges of the flanges and the braces spaced substantially equal distances apart along the member S. Pressure exerting means, such as wedges W are then driven between the bight portion of each brace and the associated flange to force the integral end portions into direct tight engagement with the opposite side of the flange. When this has been done, the web 20 is properly centered on the flanges and the bolts 32 engaged in slots 34 of straps 28. By suitable adjustment of the bolts 32 in the slots, the flanges and web are aligned in their proper relation. The flanges 14 and 22 of the member S are then preliminarily united to the web 20 thereof by a series of tack welds F spaced apart substantially equal distances along the member S.

Figure 3:
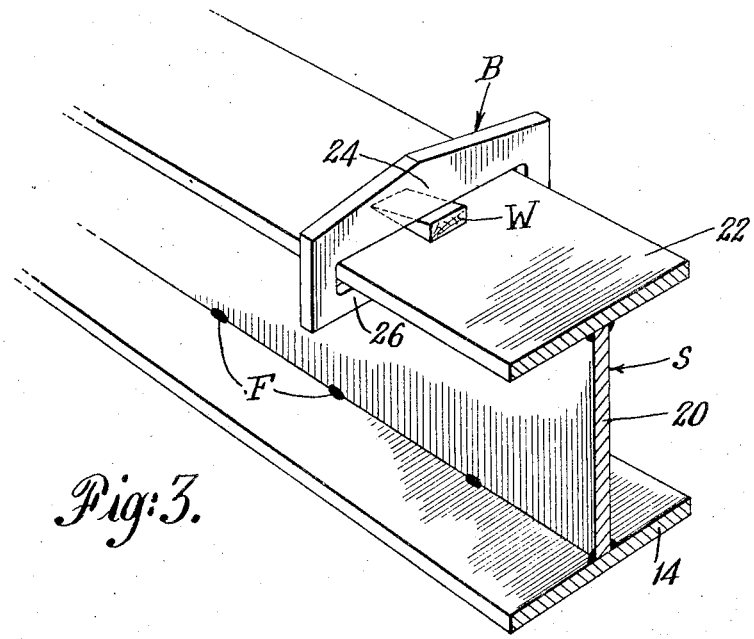
Fig. 3 is a perspective view of a brace, forming part of the invention, as applied in position on a fabricated structural member.
Figure 4:
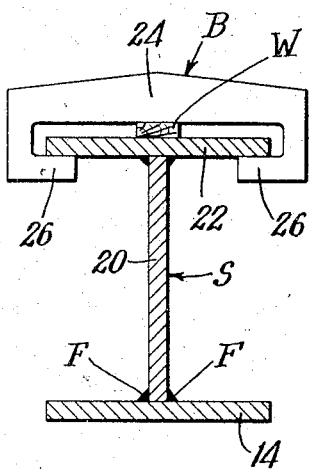
Fig. 4 is an end view of the brace and structural member shown in Fig. 1.

After the tack welding operation, additional braces B and wedges W are secured at substantially equal longitudinally spaced intervals to each flange in the manner shown in Figs. 2 and 3. One or more of the members S are then placed on the jigs J with flanges 14 and 22 in engagement with surfaces 12 and 13, respectively. The electrically-propelled carriage C carrying one or more welding devices D traverses the track T, and the welding devices thereon form a series of fillet welds between flanges 14 and 22 and web 20, permanently uniting web 20 to flanges 14 and 22. When the welds on one side of the members S have been completed, the members are repositioned on the jigs J and the welds in the opposite sides thereof made in the same manner.

During the welding, the braces B rigidly restrain the flanges 14 and 22 against distortion due to the progressive heating of the member S. The use of the wedge W in engagement with the deep bight portion 24 of each brace enables great pressure to be applied to the flanges to restrain distortion.

It will be obvious that the jig J is readily adapted to supporting other structural shapes than that shown, such as channels, T-beams, etc., and that the brace B and the aligning device of Fig. 5 may be used in forming other structural members having flange portions.

The described apparatus is simple in construction and effective to increase the handling speed, and hence reduce the overall time needed, in fabricating structural members.

While specific embodiments of the invention have been shown and described, it should be understood that this has been done only to illustrate the principles of the invention and that the same may be otherwise embodied within the scope of the appended claims.

What is claimed is:

1. Means for aligning flat plates to form a flanged structural shape comprising, in combination, a pair of braces each adapted to engage one flange of such structural shape; a wedge operatively disposed between each brace and its associated flange; and adjustable means interconnecting said braces to align said flanges in engagement with the web of such structural shape.

2. Apparatus for fabricating structural members comprising a jig formed with a pair of recesses; and perpendicularly related supporting surfaces adjacent each recess; each of said recesses being adapted to receive a flange of one of such members supported on one of said supporting surfaces, with the web of one of such members being supported on the other of said supporting surfaces in perpendicular relation to such flange.

3. Apparatus for fabricating structural members comprising, in combination, a plurality of jigs arranged at longitudinally spaced intervals, each of said jigs being formed with supporting surfaces to engage and support a structural member; and a track mounted on and interconnecting said jigs.

4. Apparatus for fabricating structural members comprising, in combination, a plurality of jigs arranged at longitudinally spaced intervals, each of said jigs being formed with supporting surfaces to engage and support a structural member; a track mounted on and interconnecting said jigs; traversing means mounted on said track; and at least one welding device mounted on said traversing means.

5. Apparatus for fabricating structural members comprising, in combination, a series of jigs arranged at longitudinally spaced intervals, each of said jigs being formed with supporting surfaces to engage and support a structural member; and a track mounted on and secured to said jigs, said track extending alongside of and laterally spaced from such series of supporting surfaces.

6. Apparatus for fabricating structural members comprising, in combination, a series of jigs arranged at longitudinally spaced intervals, each of said jigs being formed with spaced supporting surfaces to engage and support a pair of structural members; and a track mounted on and secured to said jigs, said track extending between such series of supporting surfaces and being spaced laterally therefrom.

7. Apparatus for fabricating structural members comprising, in combination, a plurality of jigs arranged at longitudinally spaced intervals, each of said jigs being formed with supporting surfaces in end portions thereof to engage and support a structural member; and a track mounted on elevated central portions of and interconnecting said jigs.

8. Apparatus for maintaining the flanges of a fabricated structural member in predetermined relation to the web thereof during fabrication of such member by welding comprising, in combination, an upper brace adapted to be rigidly secured to one flange of said member; a lower brace adapted to be rigidly secured to the other flange of said member; and a pair of straps pivotally secured to said upper brace and adjustably and detachably secured to said lower brace, whereby said flanges may be adjusted to and retained in predetermined relation to said web during the welding operation.

9. Fabricating apparatus comprising, in combination, means for aligning flat plates for welding to form a structural shape; a plurality of longitudinally spaced jigs each formed with surfaces to engage certain of said plates to support such shape during weld uniting of said plates; braces engaging certain of said plates to restrain distortion thereof during welding; a track secured to and extending throughout such series of jigs; traversing means movable along said track; and a welding device mounted on said traversing means.

10. Fabricating apparatus comprising, in combination, means for aligning flat plates for welding a web plate to a flange plate to form a beam; a plurality of longitudinally spaced jigs each formed with surfaces to engage certain of said plates to support such shape during weld uniting of said plates; braces engaging certain of said plates to restrain distortion of the flange of said beam during welding while clearing the longitudinal path of said welding device along the corner between said plates, said braces each being rigid and having a bight portion spaced from the side of the flange plate on which each brace is mounted, each brace having end portions rigid with said bight portion and depending below said flange plate and extending inward thereunder forming hooks engaging the opposite side of said flange plate; and pressure exerting means acting upon each brace and the upper side of said flange plate to force said hooks into direct pressure engagement with the underside of said flange plate, said hooks being spaced apart a distance sufficient to leave a clear space on each side of said web for access to the longitudinal seam to be welded; a track secured to and extending throughout such series of jigs; traversing means movable along said track; and a welding device mounted on said traversing means.

11. Fabricating apparatus comprising, in combination, means for aligning flat plates for welding a web plate to a flange plate to form a beam; a plurality of longitudinally spaced jigs each formed with surfaces to engage certain of said plates to support such shape during weld uniting of said plates; braces engaging certain of said plates to restrain distortion of the flange of said beam during welding, said braces each being rigid and having a bight portion of greater depth than thickness, said bight portion having a central portion spaced from the upper side of the flange plate on which each brace is mounted, each brace having end portions integral with said bight portion and depending below the said flange plate and extending inward thereunder and forming hooks engaging the opposite side of said flange plate; and a wedge interposed between the underside of the central portion of each brace and the upper side of said flange plate to force said hooks into direct pressure engagement with the underside of said flange plate, said hooks being spaced apart a distance sufficient to leave a clear space on each side of said web for access to the same when being welded; a track secured to and extending throughout such series of jigs; traversing means movable along said track; and a welding device mounted on said traversing means.

ALEX EDWARD DITTRICH.